United States Patent

Okada

[11] Patent Number: 6,137,408
[45] Date of Patent: Oct. 24, 2000

[54] CONTROLLER FOR PLURAL AREA SENSORS

[75] Inventor: Toshio Okada, Osaka, Japan

[73] Assignee: Keyence Corporation, Osaka, Japan

[21] Appl. No.: 09/158,523

[22] Filed: Sep. 22, 1998

[30] Foreign Application Priority Data

Jun. 9, 1998 [JP] Japan .................................. 10-160741

[51] Int. Cl.⁷ .................................................. G08B 13/18
[52] U.S. Cl. ........................ 340/556; 250/221; 340/518; 340/531
[58] Field of Search ...................... 340/556, 557, 340/686.5, 517, 518, 506, 533, 531, 693.5, 679; 250/221

[56] References Cited

U.S. PATENT DOCUMENTS

| | | | |
|---|---|---|---|
| 4,309,696 | 1/1982 | Nagai et al. ............................. | 340/515 |
| 4,413,259 | 11/1983 | Lutz et al. ............................. | 340/518 X |
| 4,650,990 | 3/1987 | Jönsson ................................ | 340/556 X |
| 5,015,840 | 5/1991 | Blau ........................................ | 250/221 |
| 5,281,809 | 1/1994 | Anderson et al. ................... | 340/556 X |

FOREIGN PATENT DOCUMENTS

| | | | |
|---|---|---|---|
| 064712 | 3/1997 | Japan . | |
| 2278916 | 12/1994 | United Kingdom ................... | 340/556 |
| 03405 | 6/1987 | WIPO ................................... | 340/518 |

*Primary Examiner*—Thomas Mullen
*Attorney, Agent, or Firm*—Sughrue, Mion, Zinn Macpeak & Seas, PLLC

[57] ABSTRACT

A controller for use with a plurality of area sensors that controls more than one area sensor having a multiple of optical paths connecting a set of a light projector and a light receiver, the controller comprising: a master controller, for controlling not only one of the area sensors but also at least one other area sensor; and a slave controller connected to the master controller, for performing signal transfer between the master controller and the at least one other area sensor.

14 Claims, 9 Drawing Sheets

PRIOR ART

CONTROLLER FOR PLURAL AREA SENSORS

BACKGROUND OF THE INVENTION

The present invention relates to a controller of an area sensor having a plurality of optical channels (or paths) provided within a detection area, each optical channel defined by a set of a light emitting device and a light-receiving device. In particular, the invention relates to a controller for use with a plurality of such area sensors.

An area sensor is a kind of switch that comprises a light projector having light emitting devices and a light receiver having light-receiving devices, a set of one light emitting device and one light-receiving device forming an optical channel. If any one of the optical channels is interrupted by a moving object, the area sensor turns on. Working as a switch, the area sensor ensures the safety of the operators of machine tools, punching machines, press machines, brakes, molding machines, automatically controlled machines, coiling machines, robots, casting machines and so forth. In the case of a press machine, the area sensor is positioned in a detection area which is the dangerous zone of the machine and when fingers or any other part of the operator's body enters the detection area and interrupts a particular optical channel, the sensor detects that phenomenon and takes an immediate protective action by shutting down the machine or issuing a warning signal.

The area sensor is also used in an automatic production line at plant, where it detects the presence or absence of a moving article and signals for a transfer to the next step upon detecting the article. In this case, the area sensor works as a sensor for automatic control.

An area sensor of the type is shown in FIG. 9 and it comprises a light projector 2 in which a plurality of light emitting devices 21 such as light-emitting diodes (LEDs) that emit infrared or other radiations are aligned in a specified pitch (in FIG. 9, eight light emitting devices are provided), a light receiver 3 in which a corresponding number of light-receiving devices 31 such as photodiodes 31 that are aligned in a specified pitch in correspondence with the light emitting devices 21 so that they receive infrared beams on optical paths 9 emitted from the light emitting devices 21 in the light projector 2, and a controller 4 that controls both the light projector 2 and the light receiver 3 via cables 7. The light projector 2 and the light receiver 3 are provided in a face-to-face relationship such that the projector 2 is positioned on one side of the detection area where the operator of a press machine or the like must be protected whereas the receiver 3 is positioned on the other side of the detection area. Optical beams issued from the light emitting devices in the light projector 2 travel to the corresponding light-receiving devices in the light receiver 3 and the interruption of any one optical beam is detected. The light receiver 3 is also equipped with an indicator 6 that signals the operating status of the sensor. If desired, the indicator may be provided on the light projector 2 rather than the light receiver 3.

In accordance with the control by the controller 4, the light emitting devices 21 in the light projector 2 emit cyclically in sequence (e.g. from down to up) and with synchronism being ensured between a particular light emitting device 21 and the corresponding light-receiving device 31 in the light receiver 3, only the corresponding light-receiving device 31 is rendered to be capable of light reception whereas the other light-receiving devices 31 are incapable of light reception. The reason for ensuring that only one corresponding light-receiving device 31 at a time is rendered to be capable of light reception is that the light from a particular light emitting device 21 is not necessarily launched into the corresponding light-receiving device 31 and there may be a case in which the same light is also launched into nearby light-receiving devices 31 as light of a comparatively high intensity. In other words, the conventional area sensor is of such a design that the light reception signals from all light-receiving devices 31 are collectively fed into a single binarizing circuit and, although a particular channel is interrupted by an object that has entered the detection area, the light launched into nearby light-receiving devices 31 causes the overall signal level to exceed a threshold and the sensor will erroneously determine that the projected light is being received by the fight receiver and thus fails to achieve correct detection of the object that has entered the detection area.

On the other hand, if detection is continued with only one optical path being cyclically rendered effective at a time, the entrance of an object or fingers or some other part of the human body into the detection area interrupts the optical path 9 in the affected position so that it is no longer received by the corresponding light-receiving device 31, whereupon the sensor issues a warning signal or shuts down the machine to ensure safety for the operator.

FIG. 8 is a block diagram for the area sensor under consideration. The area sensor 1 provides with the light projector 2, the light receiver 3 and the controller 4.

The light projector 2 comprises a desired number N of light emitting devices 21 (211, 212, 21N) in the form of light-emitting diodes or the like that are spaced on a desired pitch, say, 40 mm, N light emitting circuits 22 (221, 222, . . . 22N) for driving these light emitting devices 21, a gate array 23 that scan controls the N light emitting circuits 22 on a time-sharing basis to perform the necessary processing for detecting abnormalities and displaying the detected abnormality, a clocking oscillator circuit 25 and a power supply circuit 26. In the illustrated case, the operation of the light emitting circuits 22 is controlled by using the gate array 23. Needless to say, the gate array may be replaced by other control devices such as a CPU.

The light receiver 3 comprises a desired number N of light-receiving devices 31 (311, 312, . . . 31N) in the form of phototransistors or the like that are arranged on the same pitch as the light emitting devices 21 in the light projector 2, N light-receiving circuit 32 (321, 322, . . . 32N) for performing I-V conversion on the light reception signals from the respective light-receiving devices 31, a gate array 33 that scan controls the N light-receiving circuits 32 on a time-sharing basis in synchronism with the corresponding light emitting devices 21, an indicator circuit 34 that displays the status of the associated area sensor, a clocking oscillator circuit 35, a power supply circuit 36, a light reception signal processing circuit 37 that collectively amplifies, binarizes and detects the light reception signals from the light-receiving circuits 32, a detection signal output circuit, and an output circuit 38 for delivering sync signals. Besides synchronous scan control, the gate array 33 performs auxiliary detecting operations, abnormality detecting operations and processing for displaying the results of detection. As in the case of the gate array 23, the gate array 33 may of course be replaced by other control devices such as a CPU.

The controller 4 includes a control circuit 41 in the form of a gate array; the control circuit 41 receives an external input from an external input circuit using an input terminal, a mode setting from a mode setting circuit using a DIP switch, and a signal indicative of the status of light projection from a sensor connector 42 to the light projector via a light projection status signal input circuit; the control circuit 41 also receives the aforementioned detection output and a system sync signal from a sensor connector 43 to the light receiver via a detection signal input circuit and a sync signal input circuit, respectively. The control circuit 41 delivers the following three signals from an output circuit 47: a sync signal, a mode setting signal and a shutdown output signal that are respectively sent to the light projector 2, the light receiver 3 and the press machine or the like. In addition, the control circuit 41 causes an indicator LED to be lit for indicating via an indicator circuit 48 that the controller 4 is in operation and it receives from a key switch a signal for disengaging the controller 4 from a locked-out state. The controller 4 also includes a system power supply circuit 49 for supplying operating energy to the light projector, the light receiver and the controller, an internal power supply circuit 46 with which the voltage from the system power supply circuit 49 in converted to a constant operating voltage for the control circuit, and an oscillator circuit 45 for clocking the controller.

The above-described circuit configurations of the light projector, light receiver and the controller are just one example and other configurations may be employed; for example, the circuits in the controller 4 may optionally be transferred to the light projector 2 or the light receiver 3; conversely, the circuits in the light projector 2 or the light receiver 3 may be transferred to the controller 4. Thus, the individual circuits of interest are by no means limited to those shown in FIG. 8.

The foregoing description applies to the case where only one area sensor is employed. If more than one area need be detected, a corresponding number of such area sensors are necessary. FIG. 5 shows a conventional controller circuit configuration that is employed with more than one area sensor.

In the case shown in FIG. 5, two area sensors 1 and 1A are employed. The area sensor 1 includes a light projector 1, a light receiver 3 and a master controller 4 that have the same circuit configurations as the light projector 2, the light receiver 3 and the controller 4 that are shown in FIG. 8. Similarly, the area sensor 1A has a light projector 2A, a light receiver 3A and a master controller 4 that also have the same circuit configurations as shown in FIG. 8. Thus, the two master controllers 4 each have a detecting portion and an output circuit and as a system they are independent of each other. Such master controllers are used in parallel.

A problem with the design shown in FIG. 5 is that it requires signal processing for ensuring that more than one output can be handled in one line but then the number of wiring steps increases. As another problem, the number of power supply cabling steps increases and the output portion becomes unduly redundant, thereby increasing the installation space that is unduly occupied, with the result that the apparatus becomes bulky. In addition, due to the system independency, the interruption of one optical axis in one area sensor is accompanied by the reception of the light from the other area sensor, whereupon one optical signal is interfered with by another optical signal to potentially cause an erroneous operation of the apparatus.

FIG. 6 shows another controller circuit configuration that is employed with more than one area sensor. In the case shown in FIG. 6, two area sensors 1 and 1A are employed. The area sensor 1 includes a light projector 2, a light receiver 3 and a master controller 4 that have the same circuit configurations as shown in FIG. 8, and the area sensor 1A has a light projector 2A, a light receiver 3A and a master controller 4 that also have the same circuit configurations as shown in FIG. 8. Thus, the two master controllers 4 each have a detecting portion and an output circuit and as a system they are independent of each other. Briefly, the circuit configurations shown in FIG. 6 are identical to those shown in FIG. 5, except that the two independent systems are interconnected by anti-interference lines 8 and the timings of their operations are adjusted to ensure that there will be no mutual interference between two optical signals. The circuit configuration shown in FIG. 6 eliminates the possibility of erroneous operations due to the mutual interference between two optical signals but the other problems with the circuit configuration shown in FIG. 5 still remain to be solved. That is, signal processing is required to ensure that more than one output can be handled in one line but then the number of wiring steps increases. In addition, the number of power supply cabling steps increases and the output portion becomes unduly redundant, thereby increasing the installation space that is unduly occupied, with the result that the apparatus becomes bulky.

FIG. 7 shows yet another controller circuit configuration that is employed with more than one area sensor. In the case shown in FIG. 7, two area sensors 1 and 1A are employed. The area sensor 1 has a light projector 2 and a light receiver 3 and similarly, the area sensor 1A has a light projector 2A and a light receiver 3A. The two area sensors share a common controller 4 in controlling the light projectors and receivers they use. This circuit configuration solves not only the problem of requiring signal processing for ensuring that more than one output can be handled in one line, which results in the increase in the number of wiring steps, but also the problem of increasing the number of power supply cabling steps to make the output portion unduly redundant. However, the circuit configuration shown in FIG. 7 has had a serious drawback in that if there is a change in the facility that employs the detection system under consideration, namely, if the number of area sensors changes, the common controller has to be replaced by a different one.

Further, if the controller shown in FIG. 7 is a designed to be operable up to a maximum number of optical axes, one can use area sensors having a smaller number of optical axes but a need still exists to employ a bulky controller that can handle up to the maximum number of optical axes.

SUMMARY OF THE INVENTION

Under the circumstances, the present invention has as its object providing a controller for use with more than one area sensor that obviates the need to perform signal processing for ensuring that more than one output can be handled in one line, thereby reducing the numbers of wiring steps and power supply cabling steps, that is free from the problem of mutual interference between optical signals, that does not render the output portion unduly redundant, thereby eliminating the installation space that is unduly occupied by the output portion and which therefore can be rendered smaller in size. The controller of the invention has an additional feature that even if there is a change in the facility that employs the detection system, no massive changeover need be made by replacing the controller with a different one. It should be noted here the term "one line of control output" does not necessarily mean only one single output signal but may include the case where more then one output of the same signal are delivered or where a signal varying in association with that signal is also issued.

In order to achieve the object, the present invention is provided with a controller for use with a plurality of area sensors that controls more than one area sensor having a multiple of optical axes connecting a set of a light projector and a light receiver, comprising a master controller that is capable of controlling not only one of the area sensors but also at least one other area sensor and a slave controller that is connected to the master controller and which performs signal transfer between the master controller and the at least one other area sensor.

According to another aspect of the invention, there is provided a controller for use with a plurality of area sensors that controls more than one area sensor each having multiple optical axes connecting a set of light projectors and light receivers, characterized by comprising: a master controller comprising a control circuit that is capable of controlling not only one of the area sensors but also at least one other area sensor and a connector that performs signal transfer between the control circuit and the at least one other area sensor; and a slave controller that is connected to the connector in the master controller and which has an added connector for performing signal transfer between the connector and the at least one other area sensor.

Moreover, a plurality of the other area sensors are employed and the first slave controller is connected to the master controller, the second slave controller connected to the first slave controller, the third slave controller connected to the second slave controller and so on until the Nth slave controller is connected to the (N-1)th slave controller.

Furthermore, the controller described above further includes a power supply line that supplies power form the master controller to each of the slave controllers.

Still further, each of the slave controllers includes an indicator to show the status of its operation.

Still further, each of the slave controllers includes a flag for recognizing its addition.

Still further, one extension connector is provided on a side of the enclosure of the master controller and another extension connector is provided on the side of the enclosure of each of the slave controllers that is opposite the master controller and at the same height as the extension connector on the master controller, such that upon coupling the two enclosures, the one extension connector is connected to the another extension connector, thereby ensuring that the individual slave controllers can be easily added to the master controller.

Still further, the master controller performs the intended control by scanning the light emitting and light-receiving circuits in all area sensors connected to the master controller on a time-sharing basis.

According to a further aspect of the invention, there is provided a controller for use with a plurality of area sensors comprising a master controller that controls one area sensor having a multiple of optical axes connecting a set of a light projector and a light receiver and one or more slave controllers that control an equal number of other area sensors, characterized in that the master controller is capable of delivering a plurality of outputs in one line.

DETAILED DESCRIPTION OF THE PREFERRED EMBODIMENTS

The preferred embodiments of the invention will now be described with reference to FIGS. 1 to 4.

Figure 1:
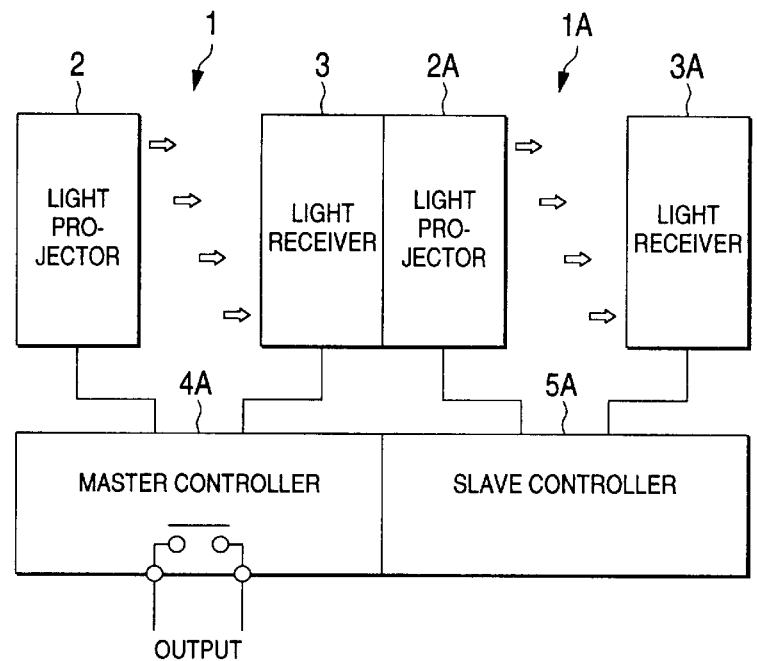
FIG. 1 shows a controller of two area sensors according to a first embodiment of the invention.
Figure 2:
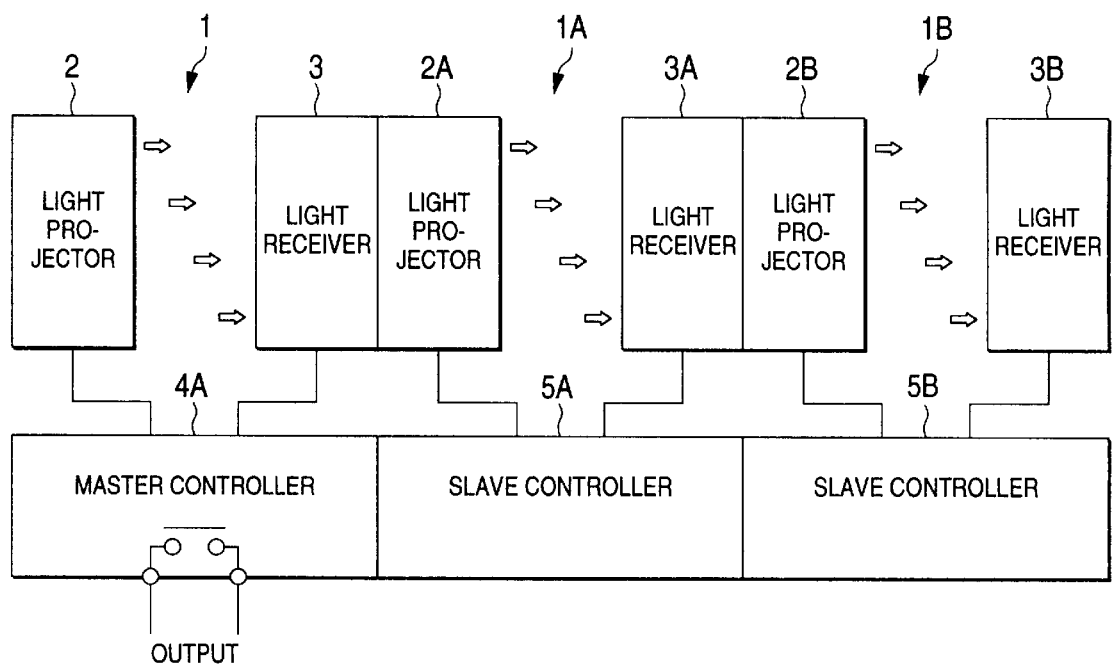
FIG. 2 shows a controller of three area sensors according to a second embodiment of the invention.
Figure 3:
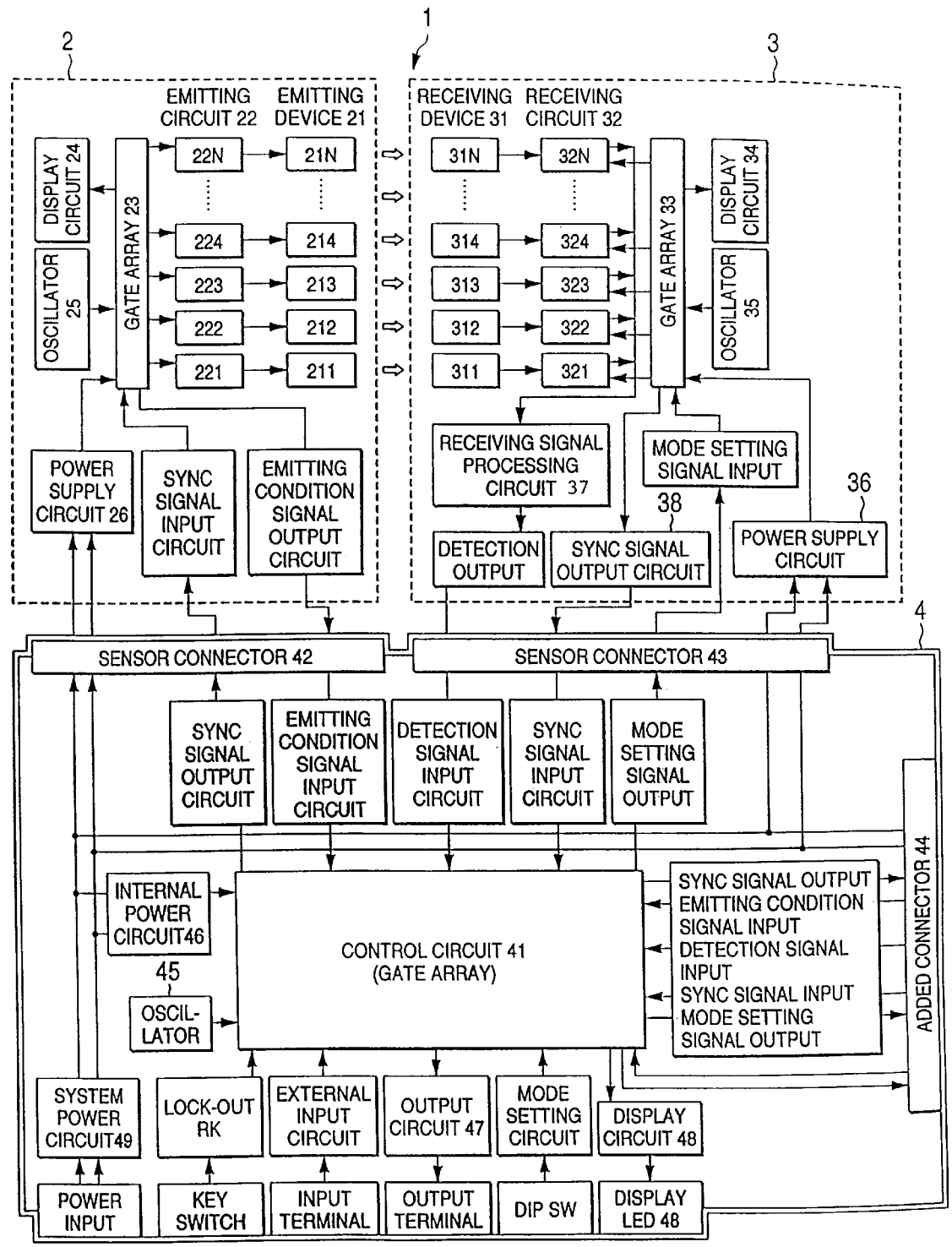
FIG. 3 is a block diagram for one of the area sensors shown in FIG. 1 and the associated master controller.
Figure 4:
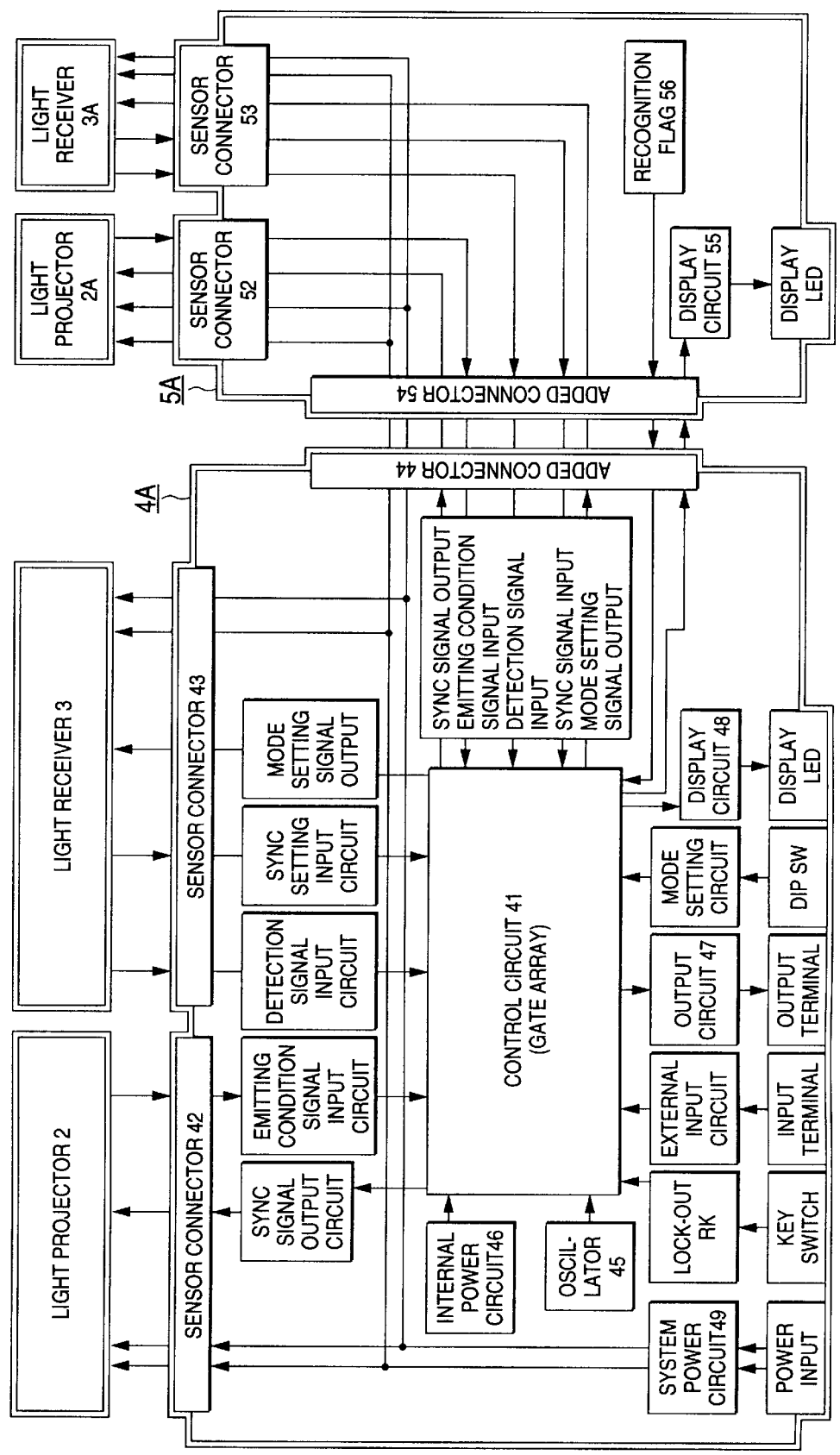
FIG. 4 is a block diagram for the master controller and the slave controller shown in FIG. 1.
Figure 5:
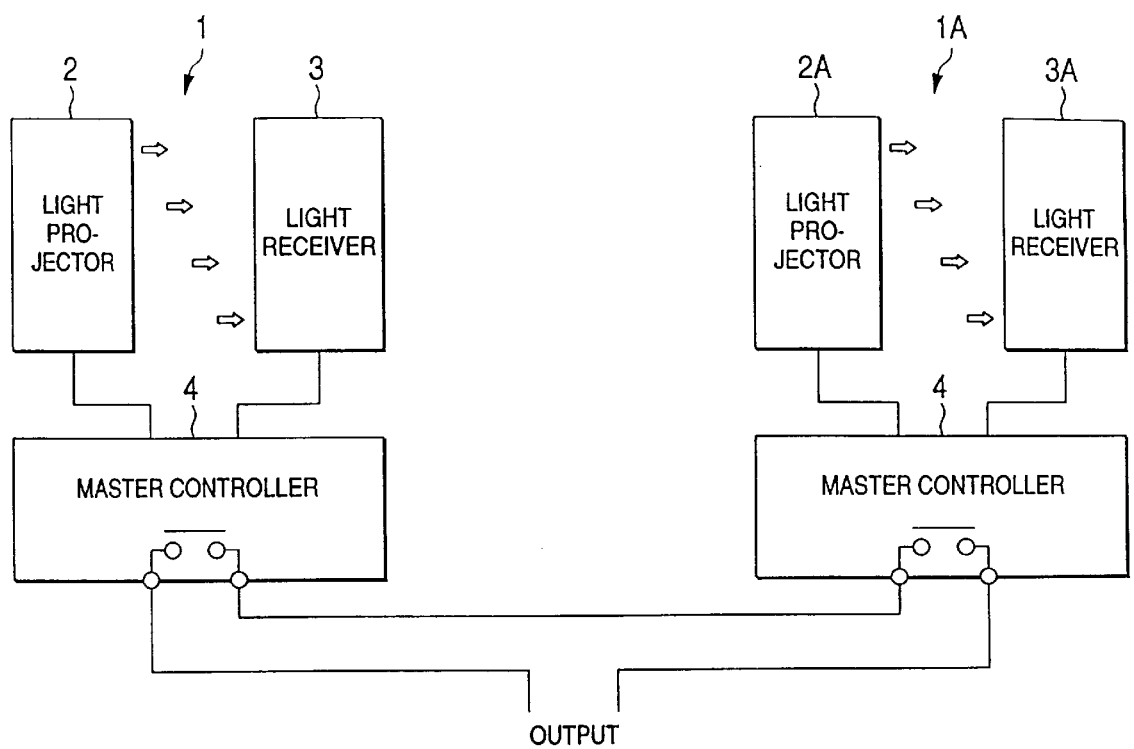
FIG. 5 shows a conventional controller of two area sensors.
Figure 6:
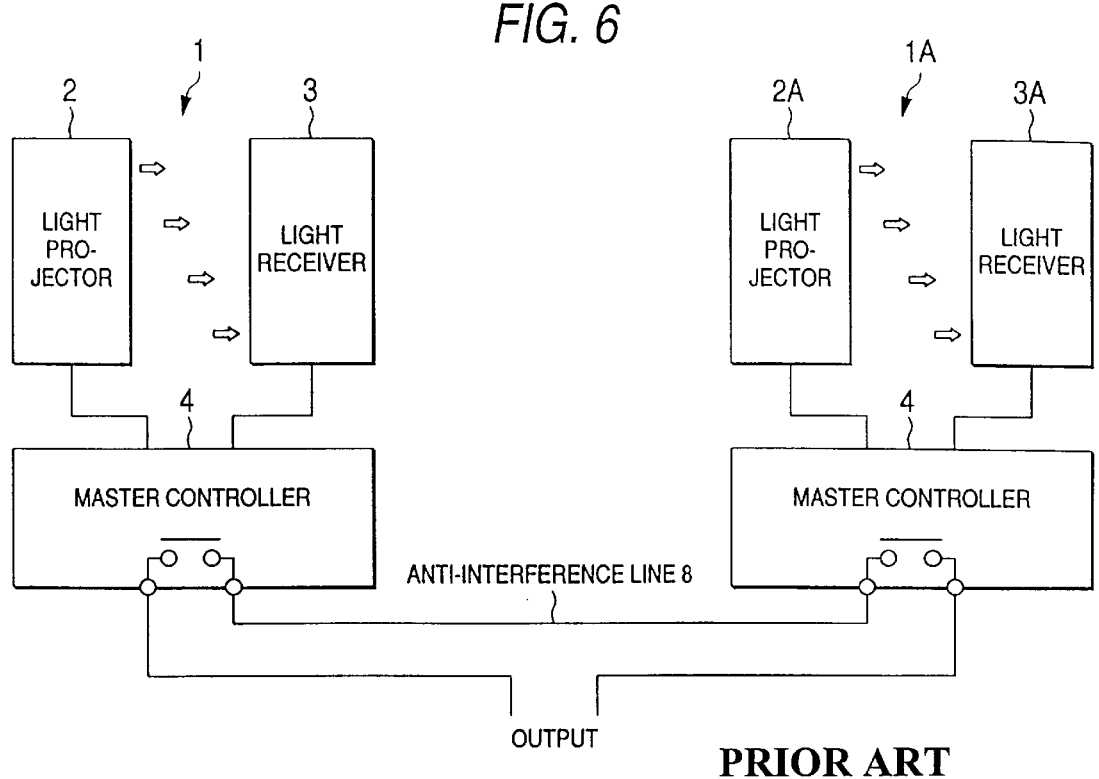
FIG. 6 shows another conventional controller of two area sensors.
Figure 7:
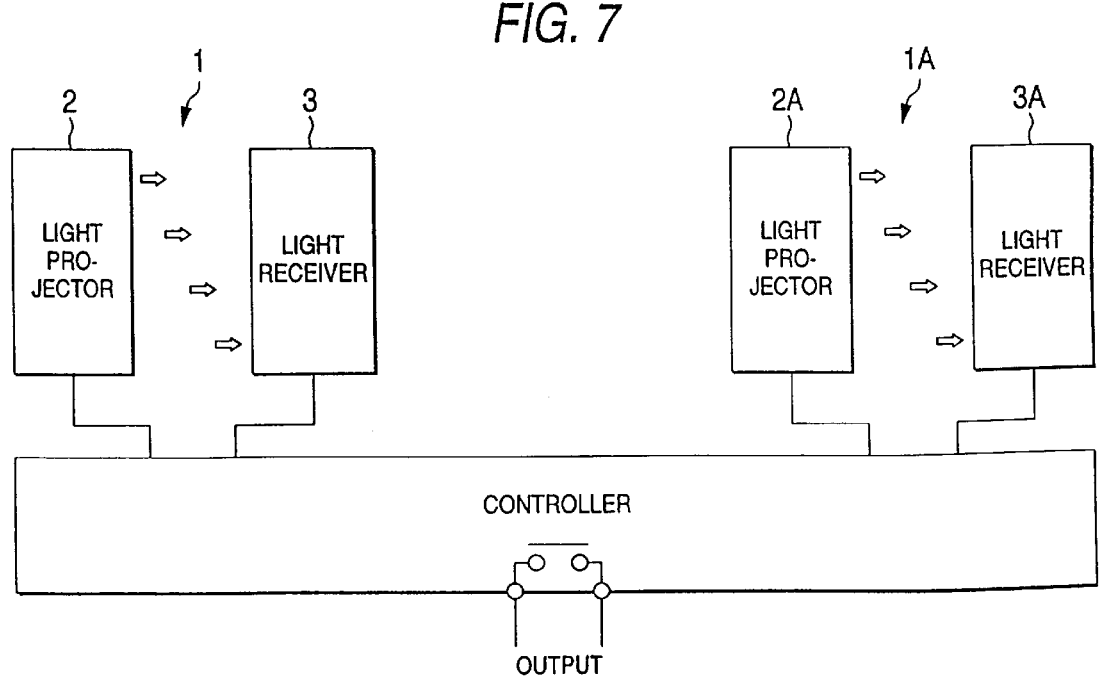
FIG. 7 shows yet another conventional controller of two area sensors.

FIG. 1 shows a controller for use with two area sensors according to a first embodiment of the invention; FIG. 2 shows a controller of three area sensors according to a second embodiment of the invention; FIG. 3 is a block diagram for one of the area sensors shown in FIG. 1; and FIG. 4 is a block diagram for the master controller and the slave controller shown in FIG. 1.

In FIG. 1, one area sensor 1 and the other area sensor 1A are shown. The area sensor 1 includes a light projector 2, a light receiver 3 and a master controller 4A whereas the area sensor 1A comprises a light projector 2A, a light receiver 3A and a slave controller 5A. Light projectors 2 and 2A and light receivers 3 and 3A have the same circuit configurations as the light projector 2 and the light receiver 3 that have been described with reference to FIG. 8. However, the master controller 4A and the slave controller 5A have different circuit configurations than those shown in FIG. 8. On the following pages, we first describe the circuit configurations of master controller 4A, light projector 2 and light receiver 3.

FIG. 3 is a block diagram showing the circuit configurations of light projector 2, light receiver 3 and master controller 4A. As shown in FIG. 3, the light projector 2 comprises a desired number N of light emitting devices 21 (211, 212, . . . 21N) in the form of light-emitting diodes or the like, N light emitting circuits 22 (221, 222, . . . 22N) for driving these light emitting devices 21, a gate array 23 that scan controls the N light emitting circuits 22 on a time-sharing basis to perform the necessary processing for detecting abnormalities and displaying the detected abnormality, an indicator circuit 24 for displaying the status of the associated area sensor, a clocking oscillator circuit 25 and a power supply circuit 26.

The light receiver 3 comprises a desired number N of light-receiving devices 31 (311, 312, . . . 31N) in the form of phototransistors or the like that are spaced on the same pitch as the light emitting devices 21, N light-receiving circuits 32 (321, 322, . . . 32N) for performing I-V conversion on the light reception signals from the respective light-receiving devices 31, a gate array 33 that scan controls the N light-receiving circuits 32 on a time-sharing basis in synchronism with the corresponding light emitting devices 21, an indicator circuit 34 that displays the status of the associated area sensor, a clocking oscillator circuit 35, a power supply circuit 36, a light reception signal processing circuit 37 that collectively amplifies, binarizes and detects the light reception signals from the light-receiving circuits 32, a detection signal output circuit and a sync signal output circuit 38. Besides synchronous scan control, the gate array 33 performs auxiliary detecting operations, abnormality detecting operations and processing for displaying the results of detection.

The master controller 4A includes a control circuit 41 in the form of a gate array; the control circuit 41 receives an external input from an external input circuit using an input terminal, a mode setting from a mode setting circuit using a DIP switch, a signal indicative of the status of light projection from a sensor connector 42 to the light projector via a light projection status signal input circuit; the control circuit 41 also receives the aforementioned detection output and a system sync signal from a sensor connector 43 to the light receiver via a detection signal input circuit and a sync signal input circuit, a respectively. The control circuit 41 delivers the following three signals from an output circuit 47: a sync signal, a mode setting signal and a shutdown output signal that are respectively sent to the light projector 2, the light receiver 3 and the press machine or the like. In addition, the control circuit 41 causes an indicator LED to be lit for indicating via an indicator circuit 48 that the master controller 4A is in operation and it receives from a key switch a signal for disengaging the master controller 4A from a locked-out state. The master controller 4A also includes a system power supply circuit 49 for supplying operating energy to the light projector, the light receiver and the controller, an internal power supply circuit 46 with which the voltage from the system power supply circuit 49 is converted to a constant operating voltage for the control circuit, and an oscillator circuit 45 for clocking the controller.

Figure 8:
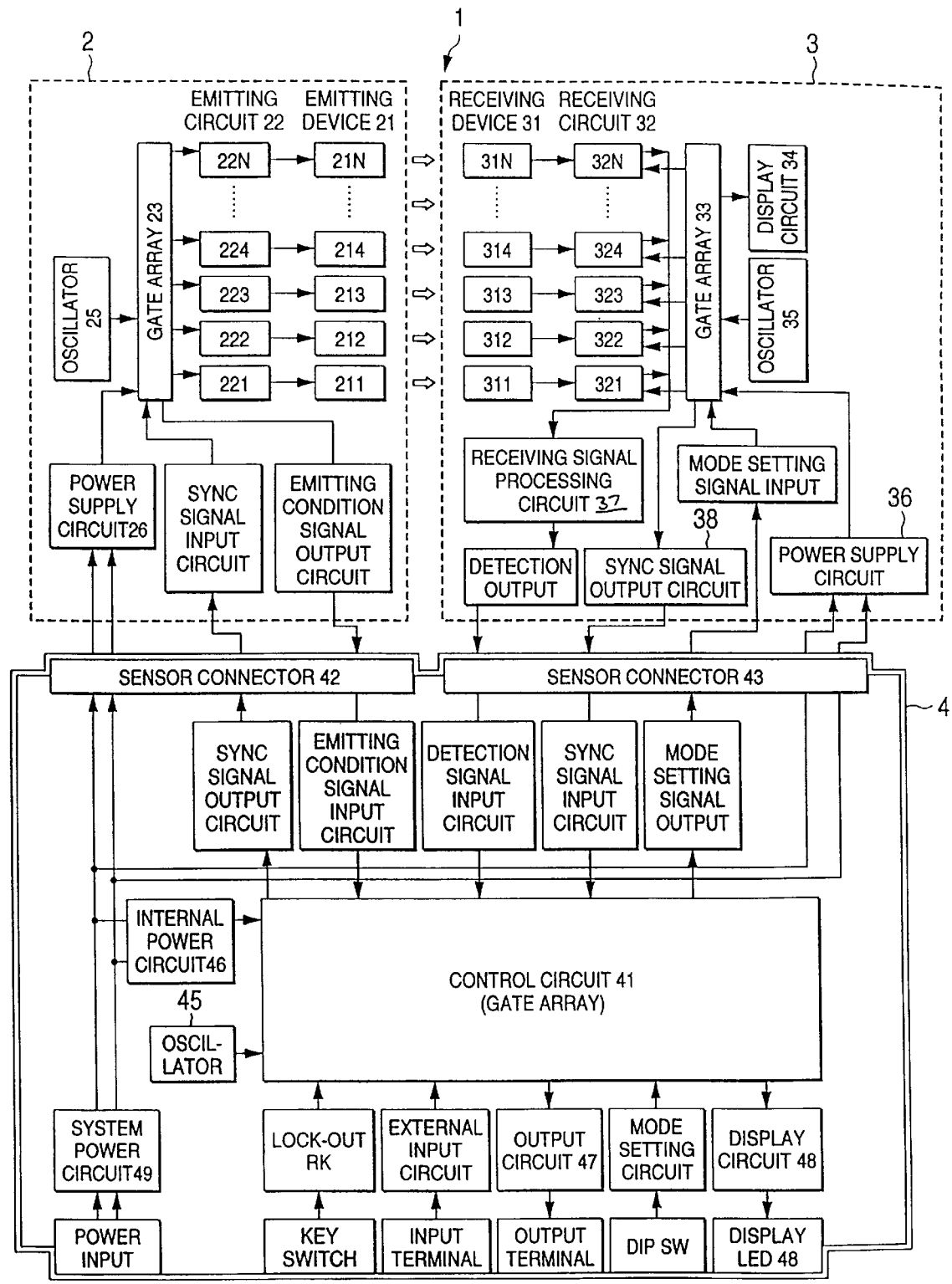
FIG. 8 is a block diagram for one of the area sensors shown in FIG. 5 and the associated master controller.
Figure 9:
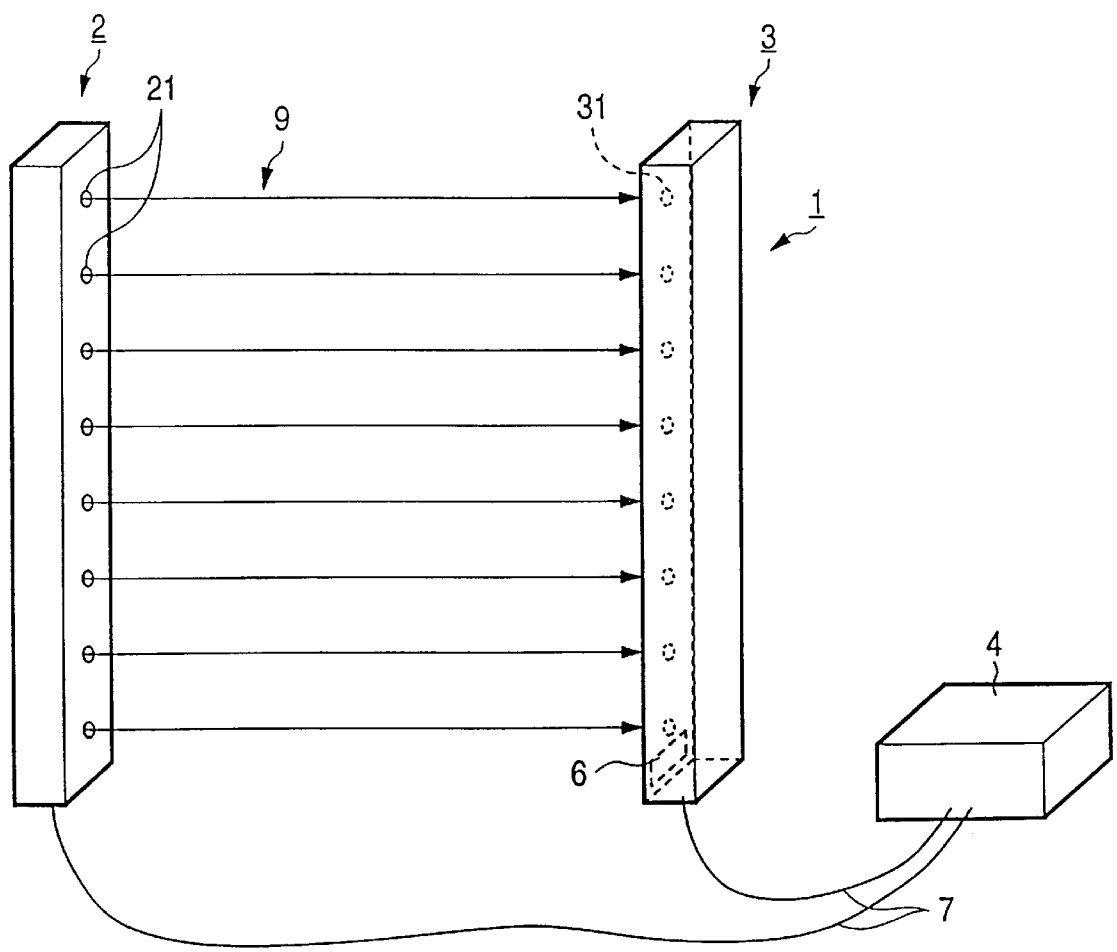
FIG. 9 is a diagrammatic perspective view of a common area sensor.

The master controller 4A differs from the controller 4 in FIG. 8 in that the control circuit 41 is capable of detecting and controlling not only the associated area sensor but also at least one other area sensor that is added as shown in FIG. 1. Briefly, in order to perform batch processing of signals from more than one area sensor, the master controller 4A has an added connector 44 that ensures that various signals associated with the added area sensor are transferred to and from an added connector 54 in the slave controller 5A. Thus, the added connector 44 outputs a sync signal for the added sensor, receives a sync signal from the added sensor, a signal indicative of the status of light projection in the added sensor and a detection signal from the added sensor that is indicative of light interruption, and outputs a mode setting signal for the added sensor. In addition, the added connector 44 supplies power energy to the slave controller 5A; further, it outputs an indicator signal that shows the operation of the slave controller as will be described later and, at the same time, it is capable of receiving a recognition flag 56 that shows the addition of the slave controller 5A to the master controller 4A.

The control circuit 41 allows all light emitting devices in the light projectors 2 and 2A to be scan lit in sequence at specified intervals that take into account the timing of light emission from those projecting devices. In synchronism with this emission timing, the control circuit 41 allows all light-receiving devices in the corresponding light receivers 3 and 3A to perform scanned light reception. If 64 optical paths can be scanned within a period of 7 ms, the number of operable optical paths can be increased up to 64. Needless to say, the control circuit 41 can perform the necessary control even if no optical paths are added. Consider here an area sensor having 16 optical paths; in this case, lines corresponding to 48(=64−16) optical paths are turned off to enable the necessary control. Thus, there is no need to replace the controller 4 by a different one in response to an increase or decrease in the number of optical paths. Not a single part of the electric circuits need be changed and yet there is no problem in the safety of operations.

FIG. 4 is a block diagram showing the interconnection between the master controller 4A and the slave controller 5A. In this block diagram, the light projector 2 and the light receiver 3 are shown on the top left side and the master controller 4A beneath. The circuit configurations of the light projector 2, light receiver 3 and master controller have already been described with reference to FIG. 3. The other set of light projector 2A and light receiver 3A is shown on the top right side of FIG. 4 and the slave controller 5A beneath. The light projector 2A and the light receiver 3A have the same circuit configurations as the light projector 2 and the light receiver 3 already described with reference to FIG. 3.

The slave controller 5A has an added connector 54 provided on a surface of its enclosure opposite the surface of the enclosure of the master controller 4A on which the added connector 44 is provided. Various signals for the added sensor are transferred to and from the master controller 4A via the added connector 54. Specifically, by way of the added connector 54, the slave controller 5A receives a sync signal for the added sensor, outputs a sync signal from the added sensor, a signal indicative of the status of light projection from the added sensor and a detection signal from the added sensor that is indicative of the status of light interruption, and receives a mode setting signal for the added sensor. In addition to the transfer of such signals, the connector 54 supplies power energy to added sensor connector 52 and 53.

The slave controller 5A also has an indicator LED that shows the status of its operation and an indicator circuit 55 for driving this indicator LED. Hence, by looking at the indicator LED, the operator can easily verify that the slave controller 5A in the added sensor is operating normally. Further, a recognition flag that shows the addition of the slave controller 5A in the added sensor is sent to the master controller 4A, which hence is capable of positive detection of the addition of the slave controller 5A upon receiving the recognition flag. An example of the applicable recognition flag is the turning on or off of the switch which is turned on to connect the slave controller 5A to the master controller 4A.

The circuit configurations described above offer the advantage that even in the case of installing two area sensors, there is no need to thread output or power cables as in the conventional sensors and the connector on the slave controller 5A needs only to be connected to the connector on the master controller 4A; as a result, the number of wiring or cabling steps is reduced and the output portion will not be rendered unduly redundant to occupy the installation space in a wasteful manner and this contributes to the manufacture of a smaller apparatus.

In addition, the light emitting and receiving circuits in the two area sensors employed are scan controlled by the single control circuit 41 on a time-sharing basis and this eliminates the chance of mutual interference between optical signals. As a further advantage, a change in the facility that employs the detection system can be dealt with by merely adding a slave controller and there is no need to replace the controller entirely.

The foregoing description concerns the case of adding one unit of slave controller 5A to the master controller 4A. If the control circuit 41 is of a type that can control up to 64 optical axes, a maximum of four area sensors can be installed assuming that each sensor has 16 optical axes. This means three slave controllers can be added to the master controller. FIG. 2 shows a second embodiment of the invention in which two slave controllers are added to the master controller. As shown, if three area sensors 1, 1A and 1B are employed, the first slave controller 5A is connected to the master controller 4A and the second slave controller 5B is connected to the first slave controller 5A.

In the illustrated case, the master controller 4A has two added connectors of the type shown in FIG. 4 and control signals from the control circuit 41 are distributed for use in area sensors 1, 1A and 1B on a specified time-sharing basis so that they are transferred to and from individual sensors via the associated connectors. The first slave controller 5A has two added connectors on the side close to the master controller 4A and one added connector on the side remote from the master controller 4A. One of the two added connectors on the side close to the master controller 4A assumes the circuit configuration shown in FIG. 4 and the other is directly connected to the added connector positioned on the side remote from the master controller 4A, so that signal transfer between the control circuit 41 and the slave controller 5B for the third area sensor 1B is performed via the slave controller 5A. The slave control 5B for the third area sensor 1B which is located on the farthest end of the system has the same circuit configuration as the slave controller 5A shown in FIG. 4.

Speaking of the power line, the three area sensors 1, 1A and 1B are connected in parallel to a system power supply circuit (indicated by 49 in FIG. 4), so two conductor wires may be passed through the first slave controller 5A toward the second slave controller 5B, from which one of them is branched for use with the associated sensor.

Figure 10:
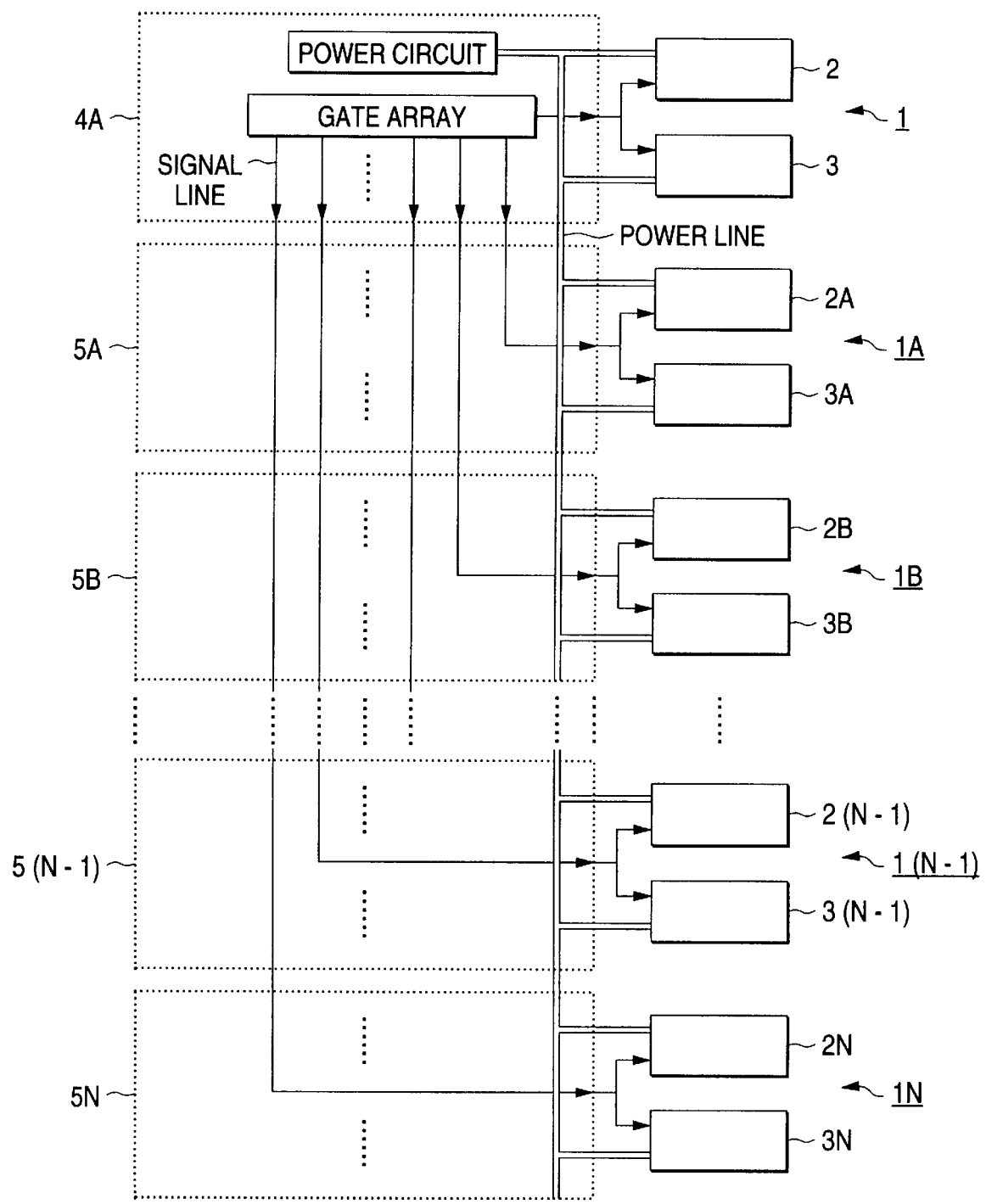
FIG. 10 shows the system configuration of the controller of the invention which is to be used with N area sensors.

The foregoing description concerns the circuit configuration of the controller to be used in the case of installing three area sensors. FIG. 10 shows the circuit configuration of a controller to be used in a more general case of installing N area sensors. As shown, the first slave controller 5A is connected to the master controller 4A, the second slave controller 5B connected to the first slave controller 5A and the Nth slave controller connected to the (N-1)th slave controller. In this general case, the master controller 4A has N added connectors for the slave controllers and control signals from the control circuit 41 (as indicated by thick lines) are distributed among the N added connectors on a specified time-sharing basis. The first slave controller 5A has N added connectors on the side close to the master controller 4A; one of the N added connectors is for use with the first slave controller and the others which are to be used with the subordinate slave controllers are passed through the interior of the first slave controller 5A. The second slave controller 5B has (N-1) added connectors on the side close to the first slave controller 5A; one of the N added connectors is for use with the second slave controller and the others which are to be used with the subordinate slave controllers are passed through the interior of the second slave controller 5B. This description applies to the subsequent slave controllers and the last (Nth) slave controller has the same circuit configuration as the slave controller 5A shown in FIG. 4.

Speaking of the power line (indicated by dual lines), the area sensors 1, 1A, 1B . . . 1N are connected in parallel to a system power supply circuit (indicated by 49 in FIG. 4), so two conductor wires may be passed through each slave controller toward the subordinate slave controller, from which one of them is branched for use with the associated sensor.

Figure 11:
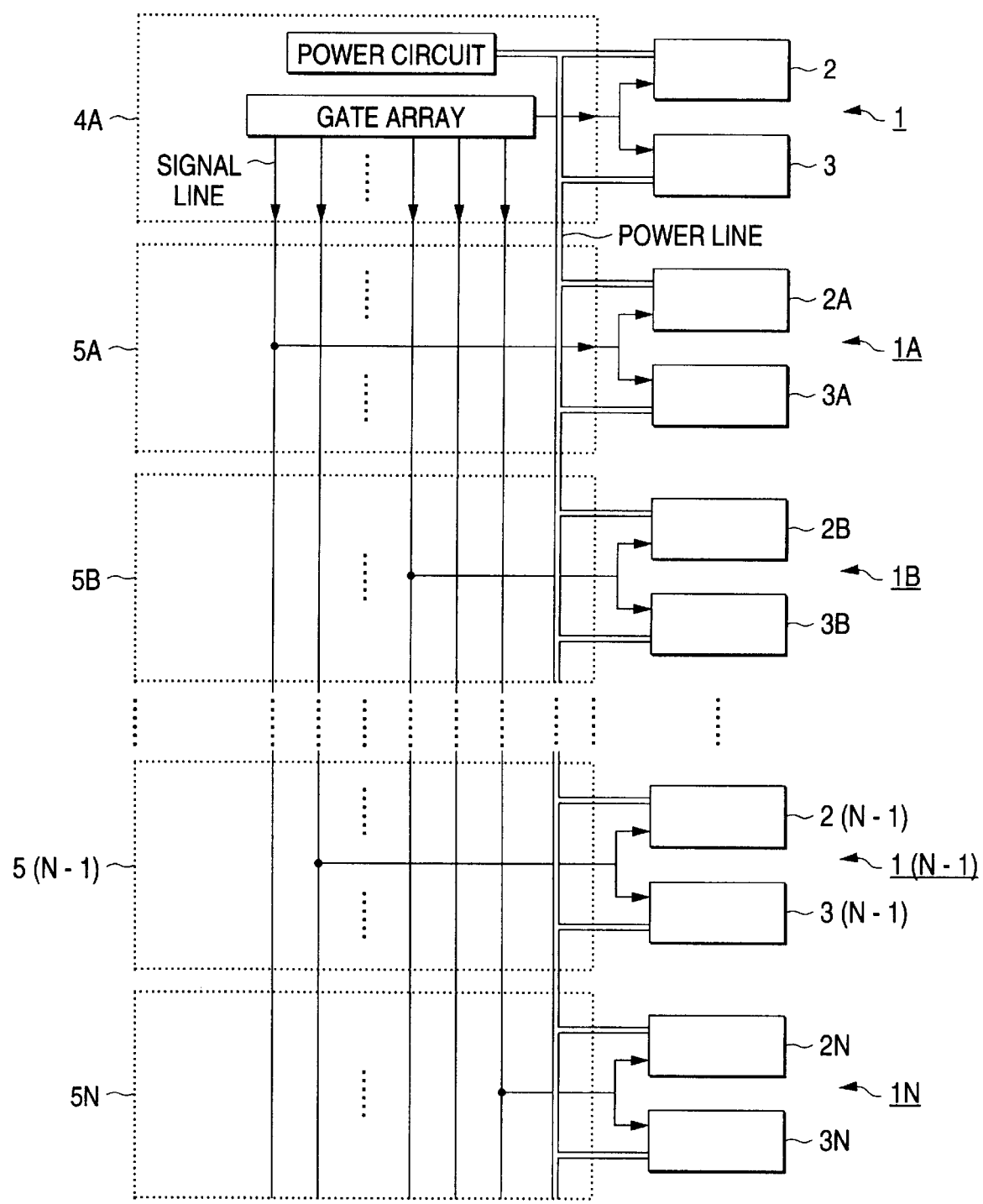
FIG. 11 shows an improved version of the controller shown in FIG. 10.

In the foregoing embodiments, the N slave controllers are to be used in a fixed order, so the addition of extra slave controllers has to be made in that order. This is not necessarily the case of the invention and a plurality of slave controllers may be used in any order if each of N slave controllers is furnished with N added connectors such that any single different added connector is used for the associated sensor only whereas the others are passed to be used for the other sensors. An exemplary system configuration for this alternative case is shown in FIG. 11. The first slave controller 5A is connected to the master controller 4A, the second slave controller 5B connected to the first slave controller 5A, and the Nth slave controller 5N connected to the (N-1)th slave controller 5(N-1). In the illustrated case, the master controller 4A has N added connectors for the slave controllers and control signals from the control circuit 41 (as indicated by thick lines) are distributed among the N added connectors on a specified time-sharing basis. Each of the first slave controller 5A to the most subordinate slave controller 5N has N added connectors and any single different added connector is used for the associated sensor only whereas the others are passed to be used for the other sensors. In FIG. 11, the slave controller 5A is connected to the area sensor 1A via the bottom signal line, the slave controller 5B is connected to the area sensor 1B via the signal line which is located the third from the top signal line, and the slave controller 5N is connected to the area sensor 1N via the top signal line, with other signal lines being passed through the respective slave controllers. With this system configuration, a plurality of slave controllers can be operated in any desired order.

Speaking of the power line (indicated by dashed lines), the N area sensors 1, 1A, 1B, . . . 1N are connected in parallel to a system power supply circuit, so two conductor wires may be passed through each slave controller toward the subordinate slave controller, from which one of them is branched for use with the associated sensor.

As described on the foregoing pages, the controller of the invention for use with a plurality of area sensors may be so designed that the master controller is adapted to control not only the associated area sensor but also the other area sensors whereas the slave controllers receive control signals for the associated area sensors from the master controller while allowing the control signals for the other area sensors to pass through themselves. It should, however, be noted that this is just one embodiment of the invention and is in no way limiting. If desired, all the functions of the master controller may be performed by the individual slave controllers, except that their outputs are delivered in one line from the master controller. This also obviates the need to perform signal processing for ensuring that more than one output can be handled in one line, thereby reducing the numbers of wiring steps and power supply cabling steps; in addition, the output portion is not rendered unduly redundant and, hence, the installation space is eliminated that is unduly occupied by the output portion and a smaller system can be realized. Further, if a change occurs in the facility that employs the detection system, there is no need to replace the controller by a different one.

Thus, according to the present invention, there is provided a controller for use with more than one area sensor that obviates the need to perform signal processing for ensuring that more than one output can be handled in one line, thereby reducing the numbers of wiring steps and power supply cabling steps, that is free from the problem of mutual interference between optical signals, that does not render the output portion unduly redundant, thereby eliminating the installation space that is unduly occupied by the-output portion and which therefore can be rendered smaller in size. The controller of the invention has the additional advantage that even if there is a change in the facility that employs the detection system, no massive changeover need be made by replacing the controller with a different one.

What is claimed is:

1. A controller for use with a plurality of area sensors, said controller controlling more than one area sensors each of said more than one area sensors having a light projector and a light receiver each, said light projector and light receiver being connected by a plurality of optical paths, said controller comprising:

a master controller, for controlling said more than one area sensors; and a slave controller connected to said master controller, for perfonning signal transfer between said master controller and said at least one of said more than one area sensors.

2. The controller according to claim 1, wherein a first slave controller is connected to the master controller, a second slave controller is connected to the first slave controller, a third slave controller is connected to the second slave controller and so on until an Nth slave controller is connected to an (N-1)th slave controller.

3. The controller according to claim 2, which further includes a power supply line that supplies power from said master controller to each of said slave controllers.

4. The controller according to claim 2, wherein each of said slave controllers includes an indicator to show a status of an operation of said each of said slave controllers.

5. The controller according to claim 2, wherein each of said slave controllers includes a way of indicating that it has been added.

6. The controller according to claim 2, wherein one added connector is provided on a side of an enclosure of said master controller and a second added connector is provided on a side of enclosures of each of said slave controllers that is opposite the master controller and at a same height as the extension connector on said master controller, such that upon coupling two of said enclosures, said one added connector is connected to said second added connector, thereby ensuring that the individual slave controllers can be easily added to the master controller.

7. The controller according to claim 1, wherein said master controller performs an intended control by scanning a light emitting circuit and a light-receiving circuit in all area sensors connected to said master controller on a time-sharing basis.

8. A controller for use with a plurality of area sensors said controller controlling more than one area sensors, each of said area sensors having a light projector and a light receiver each said light projector and light receiver being converted by a plurality of optical paths said controller comprising:

a master controller comprising a control circuit that is capable of controlling more than one of said sensors and a connector that performs signal transfer between said control circuit and at least one other area sensor; and a slave controller that is connected to the connector in said master controller and which has an added connector for performing signal transfer between said connector and said at least one of said more than one area sensors.

9. The controller according to claim 8, a first slave controller is connected to the master controller, a second slave controller is connected to the first slave controller, a third slave controller is connected to the second slave controller and so on until an Nth slave controller is connected to an (N-1)th slave controller.

10. The controller according to claim 2, which further includes a power supply line that supplies power from said master controller to each of said slave controllers.

11. The controller according to claim 9, wherein each of said slave controllers includes an indicator to show a status of an operation of said each of said slave controllers.

12. The controller according to claim 9, wherein each of said slave controllers includes a way of indicating that it has been added.

13. The controller according to claim 9, wherein one added connector is provided on a side of an enclosure of said master controller and another added connector is provided on a side of an enclosure of each of said slave controllers that is opposite the master controller and at a same height as the added connector on said master controller, such that upon coupling said two enclosures, said one added connector is connected to said another added connector, thereby ensuring that the individual slave controller can be easily added to the master controller.

14. The controller according to claim 8, wherein said master controller performs an intended control by scanning a light emitting circuit and a light-receiving circuit in all area sensors connected to said master controller on a time-sharing basis.

* * * * *